United States Patent [19]

Edelstein et al.

[11] 4,087,765
[45] May 2, 1978

[54] ORGANIC TRANSFER LASER METHOD AND MEANS

[75] Inventors: Stephen A. Edelstein; Donald C. Lorents, both of Palo Alto; Michael V. McCusker, Los Altos; Thomas F. Gallagher, Palo Alto, all of Calif.

[73] Assignee: Stanford Research Institute, Menlo Park, Calif.

[21] Appl. No.: 693,851

[22] Filed: Jun. 8, 1976

[51] Int. Cl.$^2$ .............................................. H01S 3/00
[52] U.S. Cl. .......................... 331/94.5 G; 331/94.5 L
[58] Field of Search ..................... 331/94.5 L, 94.5 G

[56] References Cited

U.S. PATENT DOCUMENTS 3,857,793  12/1974  Pappalurdo ................... 252/301.3 R

OTHER PUBLICATIONS

Gutcheck et al., *Journ. Appl. Physics*, vol. 6, No. 7, Jul. 1975, pp. 3106-3108.

*Primary Examiner*—Martin H. Edlow
*Attorney, Agent, or Firm*—Victor R. Beckman

[57] ABSTRACT

Organic transfer laser method and means are disclosed employing a gas mixture which includes an acceptor gas comprising an organic molecular vapor, and a donor gas comprising a noble gas or a group II B transition metal, such as mercury, in the vapor state. The donor gas atoms are excited to high energy metastable and/or excimer states by electron beam excitation or electron beam initiated-sustainer discharge type exciting means. Collisional transfer of electronic excitation from the excited donor gas to the lasing organic molecules takes place for excitation of organic molecules to excited singlet states in sufficient number to establish a population inversion in the electronic energy levels thereof for lasing. Depending upon the mixture employed, the laser is tunable over the visible and ultraviolet regions of the electromagnetic spectrum. Operation at high peak power levels with high efficiency is possible.

22 Claims, 3 Drawing Figures

ORGANIC TRANSFER LASER METHOD AND MEANS

BACKGROUND OF INVENTION

Although numerous gas lasers are known, they generally suffer from one or more deficiencies such as limited tunability, inability to operate at short wavelengths (e.g. in the near ultraviolet region of the spectrum), inability to produce large power outputs, lack of efficiency, and the like.

SUMMARY OF INVENTION AND OBJECTS

An object of the present invention is the provision of laser method and means which overcome the above and other shortcomings and disadvantages of the prior art.

An object of this invention is the provision of an improved gas laser which is tunable in the visible and near ultraviolet regions of the spectrum, and which may be scaled in size for operation at high peak power levels with high efficiency.

The above and other objects and advantages are achieved by use of a vapor mixture comprising a donor gas, such as a noble gas or a group IIB transition metal in the vapor state, and an organic molecular gas within a resonant optical cavity. A mixture of low partial pressure organic molecular vapor and a high partial pressure donor gas is employed. High pressure, for present laser purposes, refers to a donor gas having a partial pressure in the range of, say, 1 to 10 atmospheres. The high partial pressure donor gas is pumped with high efficiency to metastable and/or excimer electronic levels by use of an electron beam (e-beam) or electronic beam initiated-sustainer discharge type source. The probability of collision between the molecules of organic material and the energizing e-beam is small due to the low partial pressure of organic molecules within the mixture. Consequently, relatively few organic molecules are directly excited by the e-beam. By collision transfer of excitation from the excited donor gas atoms to the organic material, organic molecules are excited to the singlet states for producing a population inversion therein. Emission of a beam of radiation is stimulated from the population inversion organic molecules upon transition of the molecules from the singlet states to ground states. The material employed for the lasing organic molecules may be selected for such transitions over a wide range of the electromagnetic energy spectrum, including the ultraviolet region.

DETAILED DESCRIPTION

Figure 1:
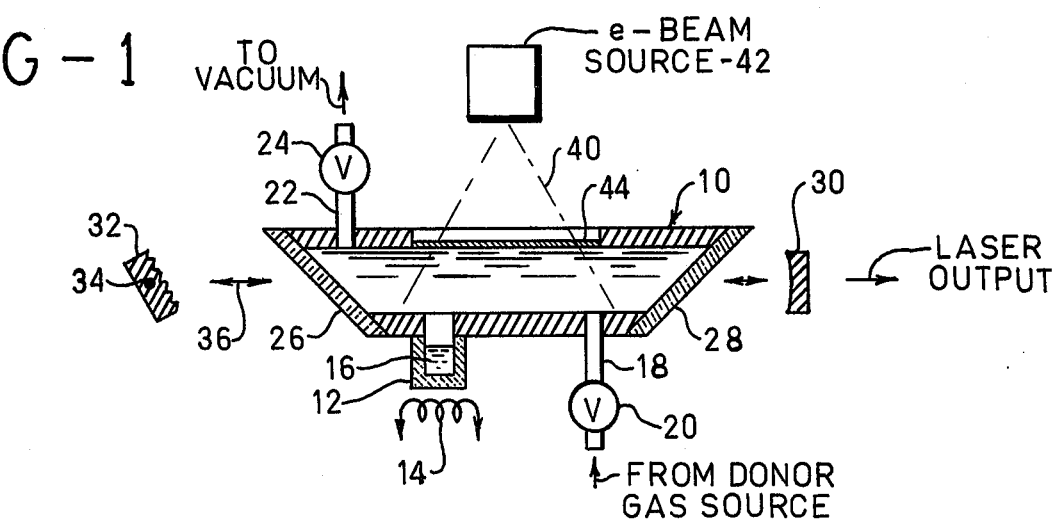
FIG. 1 is a longitudinal sectional view, partially in diagrammatic form, of a laser embodying this invention.

Reference first is made to FIG. 1 wherein an organic transfer laser is shown comprising an enclosure or reaction vessel 10 for containing a mixture of high partial pressure donor gas and low partial pressure acceptor gas. In the illustrated embodiment, a reservoir 12 in communication with the enclosure or vessel 10 is provided for organic lasing material and/or donor material which, at ambient temperature, may be in a solid or liquid form. A heat exchanger 14 may be used to vaporize, or condense, the solid or liquid within the reservoir and to establish pressures within the vessel 10. For simplicity, the heat exchanger is illustrated schematically as a heat exchange element adapted for connection to a suitable coolant or heat source, not shown. For purposes of illustration only, and not by way of limitation, an organic lasing material 16 is shown within the reservoir 12 and a gas flow system is included for introduction of a donor gas to the vessel. The illustrated gas flow system includes an inlet pipe 18 with control valve 20, and outlet pipe 22 with control valve 24, in communication with the vessel 10. The laser hardware employed depends, inter alia, upon the room temperature state (solid, liquid, or gas) of the various materials employed, including the donor and acceptor materials. For example, mixing means such as a rotating vane, or the like, not shown, may be included within the reaction vessel to promote rapid mixing of the donor gas with the organic lasing gas. Additionally, gas flow from a premixed reservoir may be used in some instances in the practice of this invention, without the need for the illustrated reservoir 12. Laser hardware which may be used in the practice of this invention is well known and requires no detailed description.

Opposite ends of the tube 10 are sealed by suitable type Brewster angle windows 26 and 28 which are substantially transparent to radiation at the laser operating frequencies. The enclosure is located within a resonant optical cavity defined at one end by a partially reflecting mirror 30 and at the other end by tuning and reflecting means 32 comprising, for example, a diffraction grating. The diffraction grating 32 is rotatable about an axis 34 extending normal to the plane of the drawing for wavelength selective reflection of the laser beam 36. Obvious alternate tuning means may be employed and for fixed wavelength operation a fixed mirror may be employed in place of the diffraction grating. It here will be noted that such resonant optical cavity and other such laser components are well known in the prior art and require no detailed description.

In accordance with the present invention pumping is effected by means of a fast, high energy, electron beam 40 provided by an electron beam (e-beam) source 42. As generally employed, and as employed in the present disclosure, a high energy electron beam refers to an electron beam source having an energy of at least approximately 100 D eV. High energy, high current, electron beam sources which are suitable for use with this invention are well known and include the Maxwell roco Beam e-beam generator.

Other suitable excitation means which may be employed in the practice of the present invention include the e-beam initiated-sustainer discharge type wherein excitation of the relatively high partial pressure donor gas is initiated by use of a high energy electron beam and excitation then is sustained by electrical discharge means. In any event, e-beam excitation is employed for excitation of the donor gas to the metastable and/or excimer states.

A window 44 is provided for passage of electrons from the source 42 into the vessel, or tube, 10. The window simply may comprise a thin metal foil for containing the gas mixture within the tube but which may be penetrated by the electron beam for exciting noble gas atoms therewithin. If an e-beam initiated-sustainer discharge type excitation system is employed, suitable electric discharge means, not shown, are included for sustaining the excitation provided initially by the e-beam. An evacuated volume is provided between the e-beam source 42 and tube 10 by any suitable means, not shown. For example, the tube and source simply may be contained within an evacuated housing, or the like. Also, focusing means, not shown, for properly directing the electron beam onto the window may be included.

The novel laser of this invention is operated with a mixture of high partial pressure donor gas and low partial pressure acceptor gas comprising organic material. For example, a mixture comprising a donor gas at a partial pressure of, say, 1 to 10 atmospheres or more and an organic molecular gas at a partial pressure of, say, 1 to 100 torr is contemplated. As noted above, one means for control of the organic molecular vapor pressure includes adjustment of the reservoir temperature (in the case of normally liquid or solid organic lasing material) or by standard gas mixing means (in the case of a normally gaseous donor and acceptor material). If a normally liquid donor material, such as mercury, is employed, the mercury may be contained in the reservoir 12 and the partial pressure thereof controlled by control of the reservoir temperature.

Donor gases which may be employed in the practice of this invention include noble gases (He, Ne, Ar, Kr, and Xe) and group II B transition metals (zinc, cadmium, and mercury). Suitable acceptor gases include, for example, naphthalene, benzene, anthracene, coronene, rhodamine B, rubrene, 9–10-diphenyl, POPOP, [ p-phenylenebis (5. - phenyl - 2. -oxazol) ] and the like, aromatic compounds, as well as mixtures of aromatic compounds. It will be understood that the invention is not limited to use with an acceptor gas of any particular organic lasing material. Aromatic ring compounds ranging from the simple benzene molecule to complex dyes may be employed as the lasing material accordance with this invention.

Figure 2:
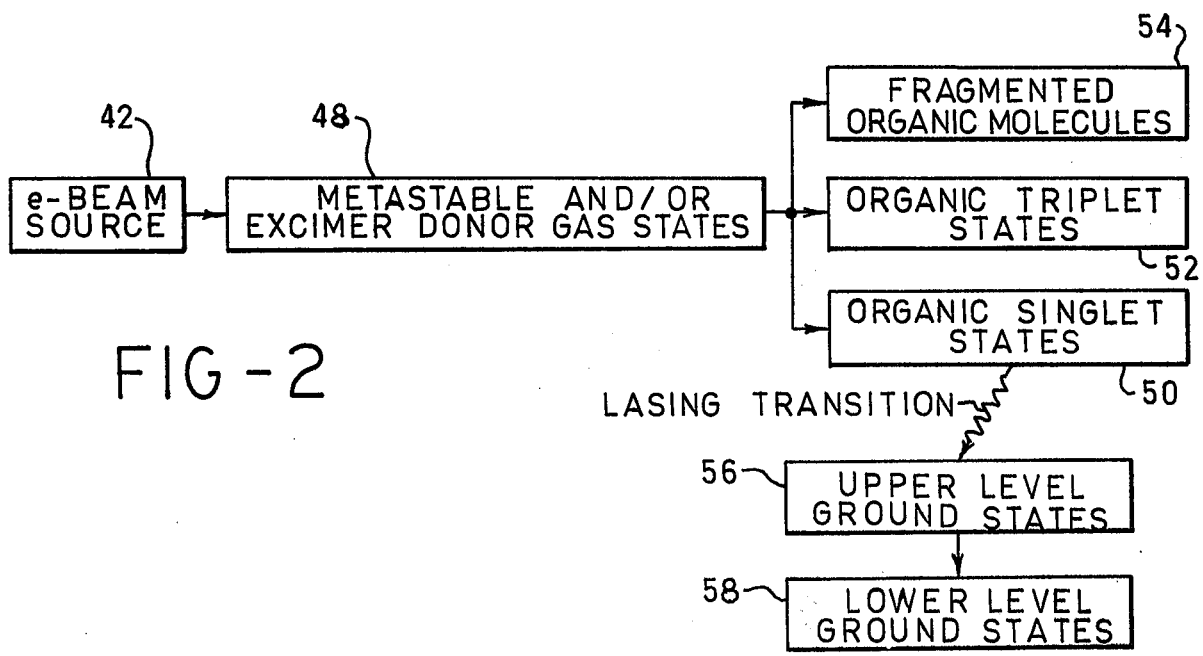
FIG. 2 is a simplified energy-flow block diagram for an organic transfer laser embodying this invention.

An argon-naphthalene transfer laser method and means embodying this invention now will be described. Naphthalene contained in the reservoir 12 is heated by element 14 to vaporize the same, and argon is introduced to the vessel through pipe 18 and valve 20. Flow of the argon-naphthalene mixture is provided by connection of the vessel to a vacuum pump through pipe 22 and valve 24. For purposes of illustration only, and not by way of limitation, the mixture employed may comprise argon gas at a partial pressure of, say, 4.3 atmospheres, and naphthalene at a partial pressure of 20 torr, which provides densities on the order of $10^{20}/cm^3$ and $6 \times 10^{17}/cm^3$ for the respective noble gas and organic molecule vapor. A high current density fast electron beam 40 from the e-beam source 42 excites the argon gas. Although the excitation level for argon atoms exceeds that for argon molecules, it will be understood that at relatively low argon gas pressures (e.g., say, 1 to 5 atmospheres) molecular excimer formation from the excited argon gas is small. As the argon gas pressure increases the formation of such excimer state increases. For example, for pumping to excimer levels donor gas pressure of, say, 5 to 10, atmospheres may be employed together with an organic molecular vapor pressure of, say, 1 to 100 torr. Pumping to either and/or both argon atom and argon molecule excited states may be employed in the operation of the laser since the energy match for energy transfer from the argon to the naphthalene molecules is good for either argon excited condition. In FIG. 2, pumping of the argon gas by the e-beam source 42 to excite the argon to metastable and-/or excimer states is identified at block 48. Pumping of the high pressure donor gas by such high density fast electron beam is very efficient.

Broadly, there are three possible channels through which excitation transfer from the metastable or excimer noble gas to the organic molecules, through collision, take place. As seen in FIG. 2, these include, (1) the creation of excited singlet states, (2) the creation of excited triplet states, and (3) the creation of organic fragments, such as CH, $C_2$, positive ions, and the like, depending upon the organic molecules employed, and in FIG. 2 the reference numerals 50, 52 and 54 identify the respective states. In the illustrated process the fragmentation of organic molecules and the formation of the long-lived triplet species represent loss processes which, as is well understood, are to be minimized for efficient laser operation.

Lasing occurs on transitions from the lowest electronic level ($S_1$) of the singlet state to high vibrational levels of the ground state. Higher singlet states (e.g. $S_2$) are produced by collisional transfer from the donor gas (argon in the illustration) and some minimal radiative transition occurs from said higher singlet levels. However, under certain conditions internal conversion from $S_2$ to $S_1$ is much faster than the $S_1$ and $S_2$ radiative decay rates whereby energy transfer into the $S_2$ level also leads to $S_1$ population.

The high level ground states (reference numeral 56) rapidly relax, on a picosecond time scale, to the lowest levels of other vibrational modes of the ground electronic state, identified by reference numeral 58. Such relaxation occurs both by "internal conversion" or relaxation of the organic molecules and by collisions with the donor gas. Emptying of the upper level ground states (comprising the lower laser states) at the above-identified rates is sufficiently rapid to allow for the lasing transitions.

Figure 3:
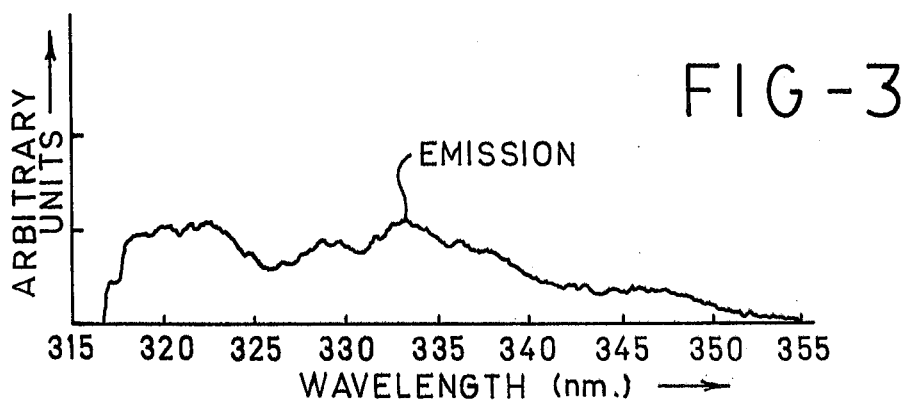
FIG. 3 is a typical emission spectrum of the laser employing electron beam excitation of an argon and naphthalene mixture.

Reference now is made to FIG. 3 wherein an emission spectrum achieved by the above-described excitation technique employing electron-beam excitation of an argon and naphthalene mixture is shown. The spectrum closely resembles the resonance fluorescence spectra of naphthalene thereby indicating that the emission is, in fact, from the first excited singlet state ($S_1$) of naphthalene. From the spectrum, it will be seen that tuning over a range of from approximately 317 nm. to 350 nm. is possible which, of course, is within the ultraviolet range of the spectrum.

The present system lends itself to scaling to high peak power levels, and operates with high efficiency. Uses for such a laser are numerous including laser isotope separation processes, laser-induced chemical processes, general laboratory applications, and the like.

The invention having been described in detail in accordance with the requirements of the Patent Statutes, various other changes and modifications will suggest themselves to those skilled in the art. For example, operation in either the pulse or continuous mode is contemplated. Also, the use of buffer and/or relaxant gases in accordance with prior art teachings is contemplated where necessary or desirable. It is intended that the above and other such changes and modifications shall fall within the scope of the invention defined in the appended claims.

We claim:

1. A laser capable of producing stimulated laser emission comprising,
   an optical resonant cavity containing a gas mixture comprising donor gas atoms, consisting of atoms of noble gas or a group IIB transition metal, and organic, aromatic compound, gas molecules at partial pressures of between about 1 to 10 atmospheres and about 1 to 100 torr, respectively,
   exciting means including electron beam means for supplying excitation to the donor gas atoms to electronically excite the same, which excited donor gas, in turn, excites organic gas molecules by collisional energy transfer, from which excited organic gas molecules stimulated laser emission is produced.

2. The laser as defined in claim 1 wherein said organic gas comprises naphthalene.

3. The laser as defined in claim 1 wherein the donor gas comprises argon and the organic gas comprises naphthalene.

4. The laser as defined in claim 1 wherein the exciting means for supplying excitation to the donor gas atoms comprises an electron beam source of fast electrons for electronic excitation of the donor gas atoms.

5. The laser as defined in claim 1 wherein the exciting means for supplying excitation to the donor gas atoms comprises an electron beam initiated-sustainer discharge type excitation means.

6. The laser as defined in claim 1 wherein donor gas atoms are excited to a metastable state by said means for supplying excitation thereto.

7. The laser as defined in claim 1 wherein donor gas atoms are excited to an excimer formation by said means for supplying excitation thereto.

8. The laser as defined in claim 1 wherein said cavity includes a reservoir for solid or liquid organic material, and means for heating the reservoir to vaporize organic material therein to produce said organic gas molecules.

9. The laser as defined in claim 8 including means for controlling the temperature of said cavity for control of the vapor pressure of said organic gas molecules.

10. The laser as defined in claim 1 wherein said organic gas is excited to the first singlet state from which lasing transition takes place.

11. In a gas laser for producing stimulated laser emission,
   a tuned optical resonant laser cavity comprising a gas mixture which includes a laser gas comprising organic, aromatic compound, gas molecules at a partial pressure of between about 1 to 100 torr and a donor gas consisting of atoms of noble gas or a group IIB transition metal at a partial pressure of between about 1 to 10 atmospheres, and
   electron beam means for supplying excitation energy to said donor gas to form metastable atoms and noble gas excimers of said donor gas, which donor gas electronically excites laser gas molecules to the singlet state by collisional transfer of energy from said metastable atoms and/or noble gas excimers of donor gas to said laser gas molecules, from which excited laser gas molecules stimulated laser emission is produced.

12. In a gas laser as defined in claim 11 wherein said organic gas molecules comprise naphthalene.

13. In a gas laser as defined in claim 12 wherein said donor gas comprises argon.

14. In a gas laser as defined in claim 11 wherein said electron beam for supplying excitation energy to said gas mixture comprises a beam of fast electrons impinging upon the gas mixture for electronic excitation of the donor gas molecules by collisional transfer with said fast electrons.

15. In a gas laser as defined in claim 11 wherein said electron beam means for supplying excitation energy to said gas mixture comprises an electron beam initiated-sustainer discharge type excitation means.

16. The method of producing optical laser energy in a resonant optical cavity which contains a gas mixture comprising atoms of donor gas, selected from the group consisting of noble gases and group IIB transition metals, and molecules of organic lasing gas, selected from the group consisting of Benzene, naphthalene, anthracene, coronene, rhodamine B, rubrene, 9–10-diphenyl, and POPOP, comprising
   establishing the donor gas partial pressure between .5 and 10 atmospheres,
   establishing the lasing gas partial pressure between about 1 to 100 torr,
   exciting by electron beam means donor gas atoms for collisional transfer of electronic excitation from the excited donor gas to lasing gas molecules to excite lasing gas molecules to the first excited singlet state in sufficient number to establish a population inversion in the electronic energy levels of the molecular lasing gas for the production of stimulated emission by lasing transition of lasing gas molecules from said excited singlet state to a high vibrational level of the ground electronic state of said laser gas molecules.

17. The method of producing optical laser energy as defined in claim 16 including,
   tuning the resonant optical cavity to produce stimulated emission having a wavelength between from the ultraviolet through the visible wavelength region.

18. The method of producing optical laser energy as defined in claim 16 wherein donor gas atoms are excited to a metastable state.

19. The method of producing optical laser energy as defined in claim 16 wherein said donor gas atoms are excited to an excimer state from which collisional transfer to lasing gas molecules is effected.

20. The method of producing optical laser energy as defined in claim 16 wherein high level ground state gas molecules return to low level ground states by internal conversion.

21. A gas laser comprising:
   a resonant optical cavity,
   within said cavity, a mixture of gases comprising molecules of organic, aromatic compound, material and donor gas atoms selected from the group consisting of noble gases and group IIB transition metals, the partial pressure of said donor gas lying in the range of .5 to 10 atmospheres and the partial pressure of said organic molecular gas lying in the range of 1 to 100 torr, and
   electron-beam type exciting means for exciting said donor gas so that energy is collisionally transferred from the donor gas to the molecules of organic gas for emission of radiation.

22. The gas laser as defined in claim 21 wherein said organic material is benzene, naphthalene, anthracene, coronene, rhodamine B, rubrene, 9–10-diphenyl or POPOP.

* * * * *